United States Patent

Di Pippo et al.

[11] Patent Number: 5,886,700
[45] Date of Patent: Mar. 23, 1999

[54] THREE-DIMENSIONAL VOLUME SELECTION TOOL

[75] Inventors: Mark J. Di Pippo, Newport; Bruce J. Bates, Portsmouth, both of R.I.

[73] Assignee: The United States of America as represented by the Secretary of the Navy, Washington, D.C.

[21] Appl. No.: 903,242

[22] Filed: Jul. 24, 1997

[51] Int. Cl.[6] ...................................................... G06F 3/00
[52] U.S. Cl. .......................... 345/355; 345/348; 345/419
[58] Field of Search ..................................... 345/355, 340, 345/352, 353, 354, 339, 341, 342, 343, 344, 345, 346, 347, 348, 349, 350, 351, 333, 326, 227–328, 334

[56] References Cited

U.S. PATENT DOCUMENTS

| | | | |
|---|---|---|---|
| 5,511,157 | 4/1996 | Wang | 345/339 |
| 5,602,564 | 2/1997 | Iwamura et al. | 345/119 |
| 5,689,628 | 11/1997 | Robertson | 345/340 |
| 5,742,287 | 4/1998 | Lection et al. | 345/355 |
| 5,767,854 | 6/1998 | Anwar | 345/355 |
| 5,774,122 | 6/1998 | Kojima et al. | 345/355 |
| 5,808,612 | 9/1998 | Merrick et al. | 345/351 |

*Primary Examiner*—Raymond J. Bayerl
*Assistant Examiner*—Steve Sax
*Attorney, Agent, or Firm*—Michael J. McGowan; Prithvi C. Lall; William F. Eipert

[57] ABSTRACT

A method for manipulating a three-dimensional sub-volume within a graphical display is disclosed and includes selecting an option from a menu screen to relocate or re-size a three-dimensional sub-volume within the graphical display, and upon selecting the option to relocate or re-size, proceeding with the following. A cursor is placed on either the sub-volume or a selected corner of the sub-volume within the graphical display, a selected one of a left and a right mouse buttons is depressed, and the sub-volume is dragged to a relocation area or resized within an "x-y" plane and/or a "z" plane of the graphical display according to depression of the selected mouse button and placement of the cursor. When the selected one of the left and right mouse buttons is released, the x, y, and z-coordinates of the relocation area and/or resizing are locked. The sub-volume is, therefore, manipulated within a three-dimensional frame of reference by controlling the mouse.

21 Claims, 6 Drawing Sheets

THREE-DIMENSIONAL VOLUME SELECTION TOOL

STATEMENT OF GOVERNMENT INTEREST

The invention described herein may be manufactured and used by or for the government of the United States of America for governmental purposes without the payment of any royalties thereon or therefor.

BACKGROUND OF THE INVENTION (1). Field of the Invention

This invention generally relates to providing a method for graphically selecting a sub-volume (a subset of the original volume) within a larger volume containing three-dimensional data. The tool uses state of the art graphical user interface (GUI) technology for manipulating the selected sub-volume. The processing might include but is not limited to route planning, managing mine placement, target search planning, off-board sensor management, counter detection avoidance management, oceanographic/atmospheric surveillance and weapon trajectory planning. In addition, this software engineering tool would be a useful addition to any computer aided design (CAD) program. In particular, it is a method and device for detecting coordinates of and computing a volume of a selected and/or manipulated sub-volume.

(2). Description of the Prior Art

Earlier methods for selecting a sub-volume include the computation of the sub-volume corner coordinates and the editing of the data in a tabular or spread sheet format. This can be a time consuming method which introduces errors. Another alternative is the virtual reality technique of walking or flying through the data to a point which gives an equivalent view to the inventive method. This alternative, however, does not permit an accurate and systematic sub-volume by sub-volume search capability.

The following patents, for example, disclose some selection and manipulation of a sub-volume: U.S. Pat. No. 4,766,556 to Arakawa; U.S. Pat. No. 4,812,829 to Ebina et al.; U.S. Pat. No. 5,067,167 to Berger; U.S. Pat. No. 5,414,801 to Smith et al.; U.S. Pat. No. 5,432,984 to Funaki; and U.S. Pat. No. 5,471,569 to Katoh. However, none of these patents disclose a method for selecting a sub-volume using a mouse.

Specifically, the patent to Smith et al. presents a method for viewing elements of a three-dimensional space by changing the viewpoint and viewing angle using a mouse and function keys. This is often called the "fly through method." This approach is exactly the approach the present invention replaces with a more efficient, more precisely controlled, and more user friendly method. The inventive approach selects the sub-volume directly, thereby avoiding the necessity of picking the viewpoint and viewing angle. The inventive method of selecting the sub-volume boundaries is completely new and not included in the Smith et al. patent. Further, the clipping operation described in Smith et al. is two-dimensional whereas the present technique is three-dimensional.

The patent to Berger discloses a method for rotating three-dimensional images and does not provide a method for selecting three-dimensional sub-volumes. Instead, Berger permits the selection of different viewpoints via rotation.

Regarding each of the patents to Ebina et al., Katoh, Funaki, and Arakawa, there are disclosed various techniques for pointing to and selecting objects in a three-dimensional space, and do not permit the selection of a sub-volume of three-dimensional space. Further, the present inventive method of using the mouse for selecting the sub-volume is not described in, any of the above patents.

It should be understood that the present invention would in fact enhance the functionality of the above patents. The described and claimed technique of sub-volume selection would serve as an additional component involved in the process of three-dimensional object selection. It would be used prior the selection of the objects and would make the operation simpler and more efficient.

SUMMARY OF THE INVENTION

Therefore it is an object of this invention to provide a method for manipulating a three dimensional subset using a graphical interface in a CAD or other related environment.

Another object of this invention is to provide a method for manipulating a three-dimensional object by relocating the object in an "x,y" plane using a mouse.

Still another object of this invention is to provide a method for manipulating a three-dimensional object by relocating the object in a "z" plane using a mouse.

A still further object of the invention is to provide a method for manipulating a three-dimensional object by resizing the object in an "x,y" plane using a mouse.

Yet another object of this invention is to provide a method for manipulating a three-dimensional object by resizing the object in a "z" plane using a mouse.

Still another object of this invention is to provide a method for manipulating a three-dimensional object by resizing or relocating the object in any of an x, y, or z direction using a mouse and for computing coordinates and a sub-volume for that object.

In accordance with one aspect of this invention, there is provided a method for changing both a size and a location of a sub-volume of a prism by altering selected quantitative values of the sub-volume prism. Resizing and relocating of the sub-volume is accomplished with the use of the mouse buttons and depressing a selected button in order to manipulate the sub-volume in a three-dimensional manner.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
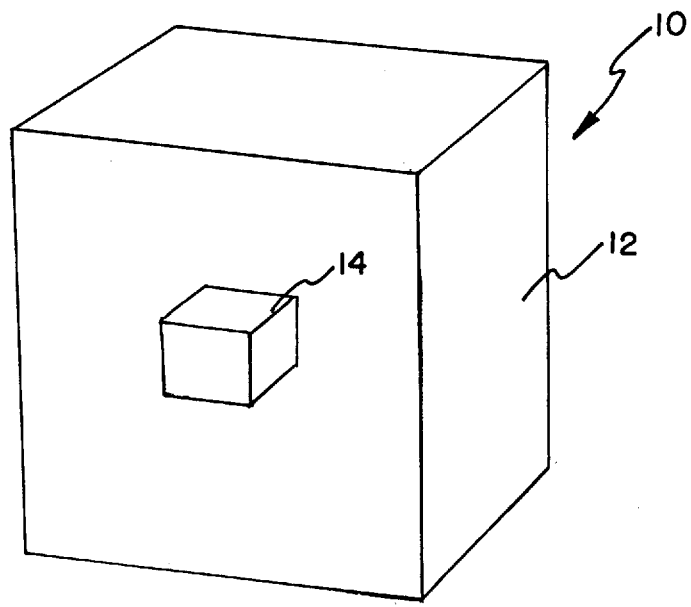
FIG. 1 is a perspective view of a three-dimensional subset prism within a larger prism according to the present invention.

Referring now to the figures, FIG. 1 illustrates a graphical display 10 including a full screen three-dimensional view 12, illustrated here as a rectangular prism. A rectangular prism 14 of the same perspective as the large rectangular prism 12 but of a smaller size appears on the display 10. The smaller prism 14 represents a sub-volume of the larger prism 12.

An operator can change both the size and location of the sub-volume prism 14 by altering certain quantitative values of the sub-volume prism 14. A resizing operation of the sub-volume prism 14 includes two distinct operations: 1) changing a size in an "(x,y)" direction, and 2) changing a size in a "z" direction. A standard coordinate system is utilized in which the "x-y" plane is parallel to the screen and the "z" plane is perpendicular to the "x-y" plane, or into the screen.

Figure 2:
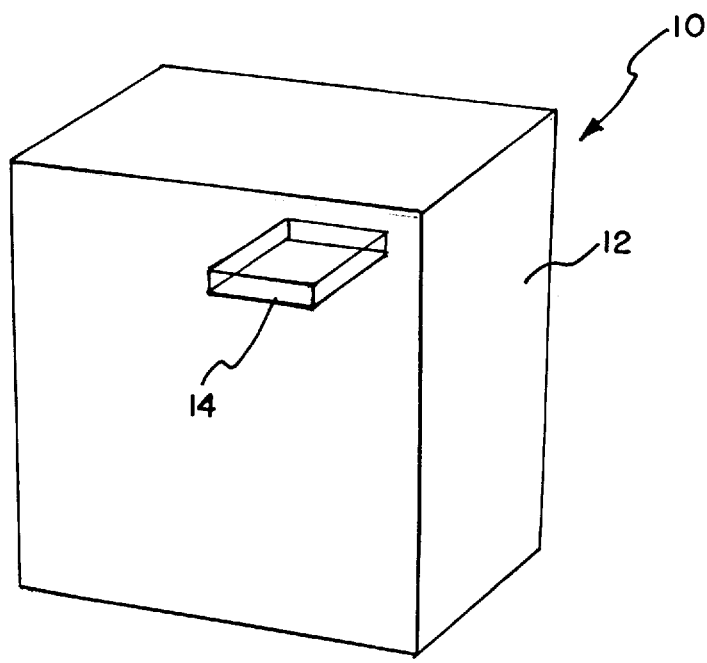
FIG. 2 is perspective view of the subset prism shown in FIG. 1 translated to an alternate position and re-sized within the larger prism according to the present invention.

Similarly, a relocation operation includes the two distinct operations of: a relocation in an "(x,y)" direction, and a relocation in a "z" direction. The result of both resizing and relocating the sub-volume prism 14 is shown in FIG. 2. Examples of the dimensions and center coordinates are as follows:

FIG. 1

Center: x=182.5, y=184.0, and z=44.5.

Dimensions: x=63.8, y=62.8 and z=69.8.

FIG. 2

Center: x=170.5, y=204.5, and z=247.0.

Dimensions: x=97.0, y=23.0, and z=98.8.

Figure 3:
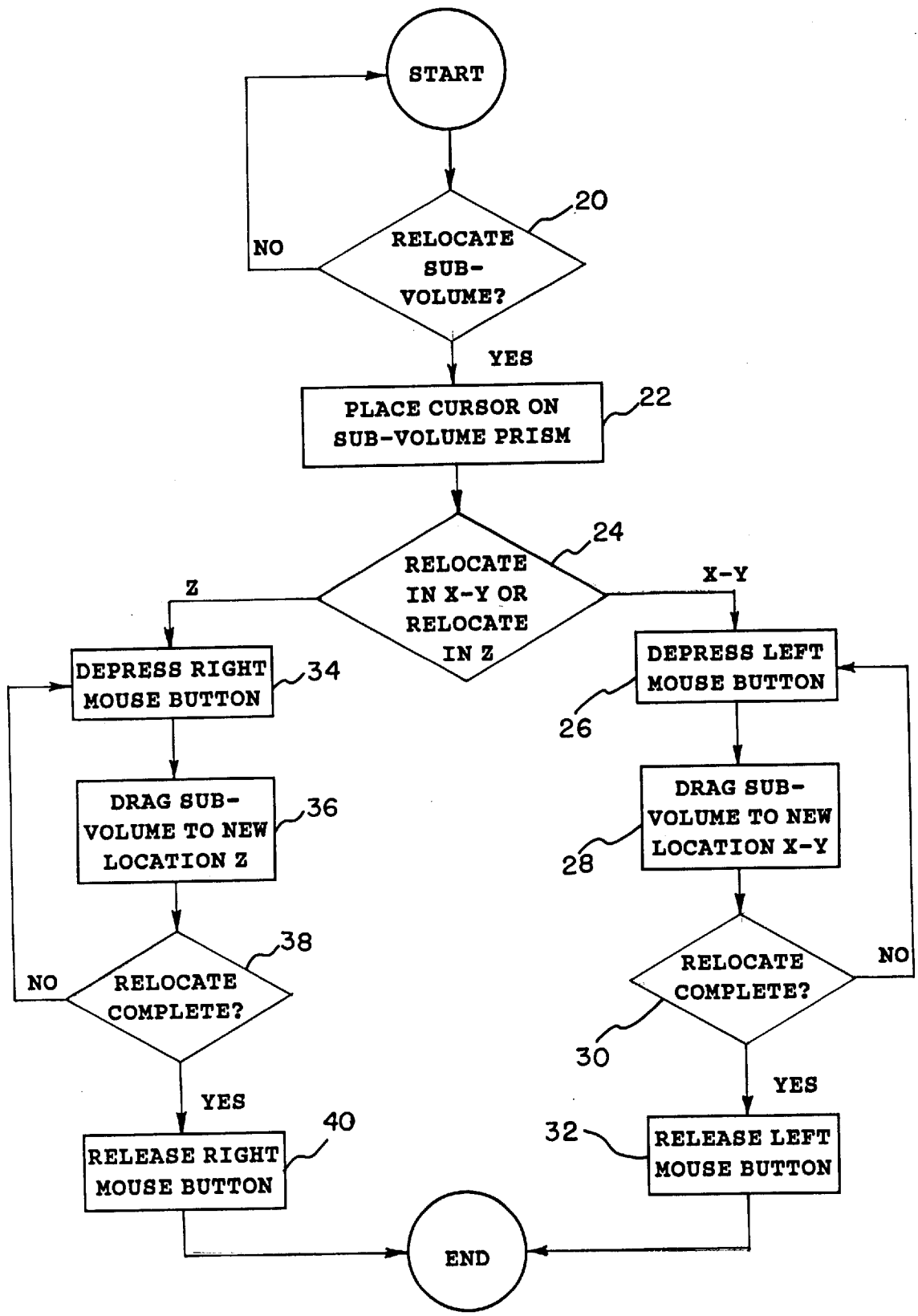
FIG. 3 is a flow chart illustrating a method of relocating a sub-volume in "x", "y", and "z" according to the present invention.
Figure 7:
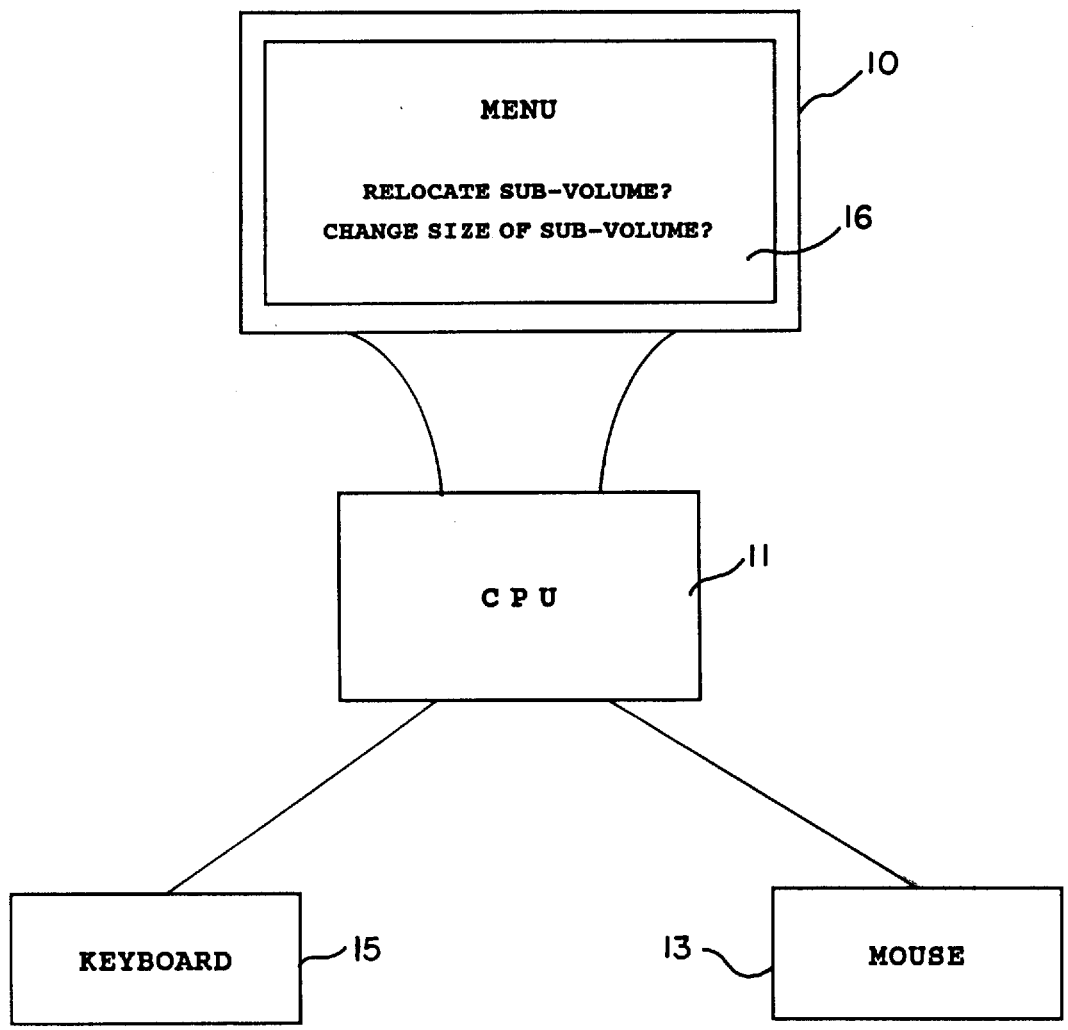
FIG. 7 is a block diagram illustrating hardware components for implementing the process of the present invention.

Referring now to the flow chart of FIG. 3, if an operator wants to relocate the sub-volume prism 14, it is possible to do so by selecting in step 20 a "relocate sub-volume" choice from a menu 16 shown by way of example in FIG. 7. A method of relocation can either be in the "x-y" plane beginning at step 26 or along the "z" axis (in the "z" plane) beginning at step 34. A relocation in either of the "x-y" plane or the "z" plane is accomplished by placing the cursor arrow on the sub-volume prism 14 in step 22. If a decision has been made in step 24 to relocate the sub-volume prism 14 in the "x-y" plane, the left mouse button is depressed and held in step 26, and the sub-volume prism 14 is dragged to the new location "(x,y)" in step 28 with the "z" value held constant. A determination is made in step 30 if the relocation in the "x-y" direction/plane is complete. If "yes", then the left mouse button is released in step 32. If "no", then the program returns to step 26 to continue relocation in the "x,y" direction. Upon release of the left mouse button at step 32, the relocation in an "x,y" direction is terminated.

Alternatively, relocating in a "z" direction can be accomplished beginning at step 34. With the cursor arrow placed on the sub-volume from step 22, the right mouse button is depressed and held in step 34, and the sub-volume prism 14 is dragged to a new location in the "z" direction at step 36. A determination is made in step 38 if relocation in the "z" direction is complete. If "yes", then the right mouse button is released in step 40. If "no", then the program returns to step 34 to continue relocation in the "z" direction. Upon release of the right mouse button at step 40, the relocation process in a "z" direction is terminated.

Figure 4:
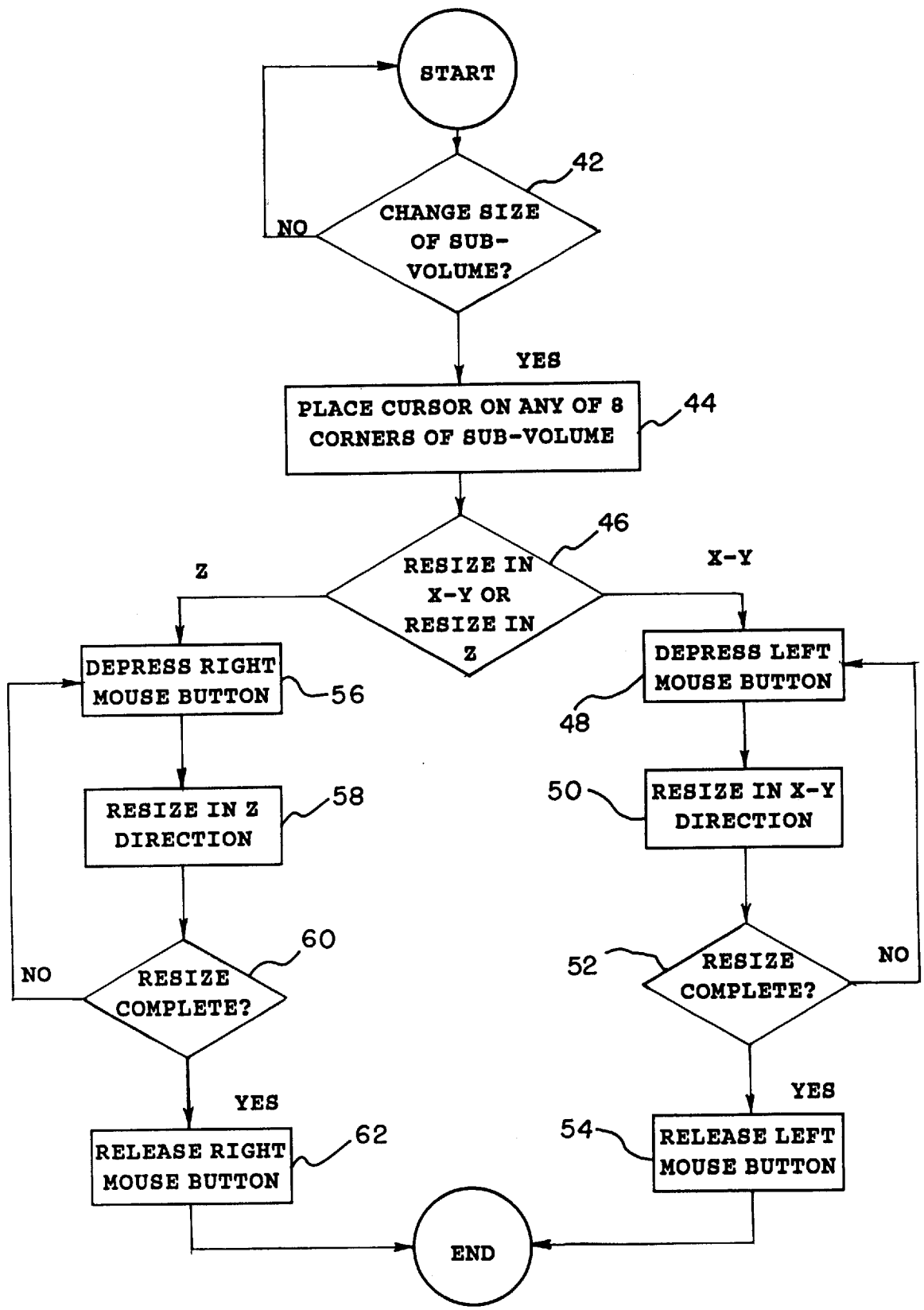
FIG. 4 is a flow chart illustrating a method of changing a size of a sub-volume according to the present invention.

Referring now to FIG. 4, there is illustrated a method of changing the size of the sub-volume prism 14. This is accomplished by selecting a "change size of sub-volume" from the menu 16 in step 42. A method of resizing of the sub-volume prism 14 can either be in the "x-y" plane with "z" held constant or in a "z" plane with "(x,y)" held constant. Each resizing in either the "x-y" plane or the "z" plane begins with the positioning of the cursor on any of the eight corners of the sub-volume 14 at step 44. If it is desired to change the size of the sub-volume in the "x,y" direction (see decision step 46), the left mouse button is depressed to select that corner in step 48. With the left mouse button depressed, the operator may resize in either the "x" or "y" direction or both at step 50. A determination is made in step 52 as to whether the resizing in the "x,y" direction is complete. If "yes", then the left mouse button is released in step 54. If "no", then the program returns to step 48 for continued resizing in the "x-y" plane. Upon completion of the resizing in the "x-y" plane and release of the left mouse button in step 54, the resizing of the sub-volume 14 is fixed in that plane.

Alternatively, if it is desired to change the size of the sub-volume in the "z" direction (see decision step 46), the right mouse button is depressed upon selecting the corner in step 56. With the right mouse button depressed, the operator may resize in the "z" direction at step 58. A determination is made in step 60 as to whether the resizing in the "z" direction is complete. If "yes", then the right mouse button is released in step 62. If "no", then the program returns to step 56 for continued resizing in the "z" plane. Upon completion of the resizing in the "z" plane and release of the right mouse button in step 62, the resizing of the sub-volume 14 is fixed in that plane.

Figure 5:
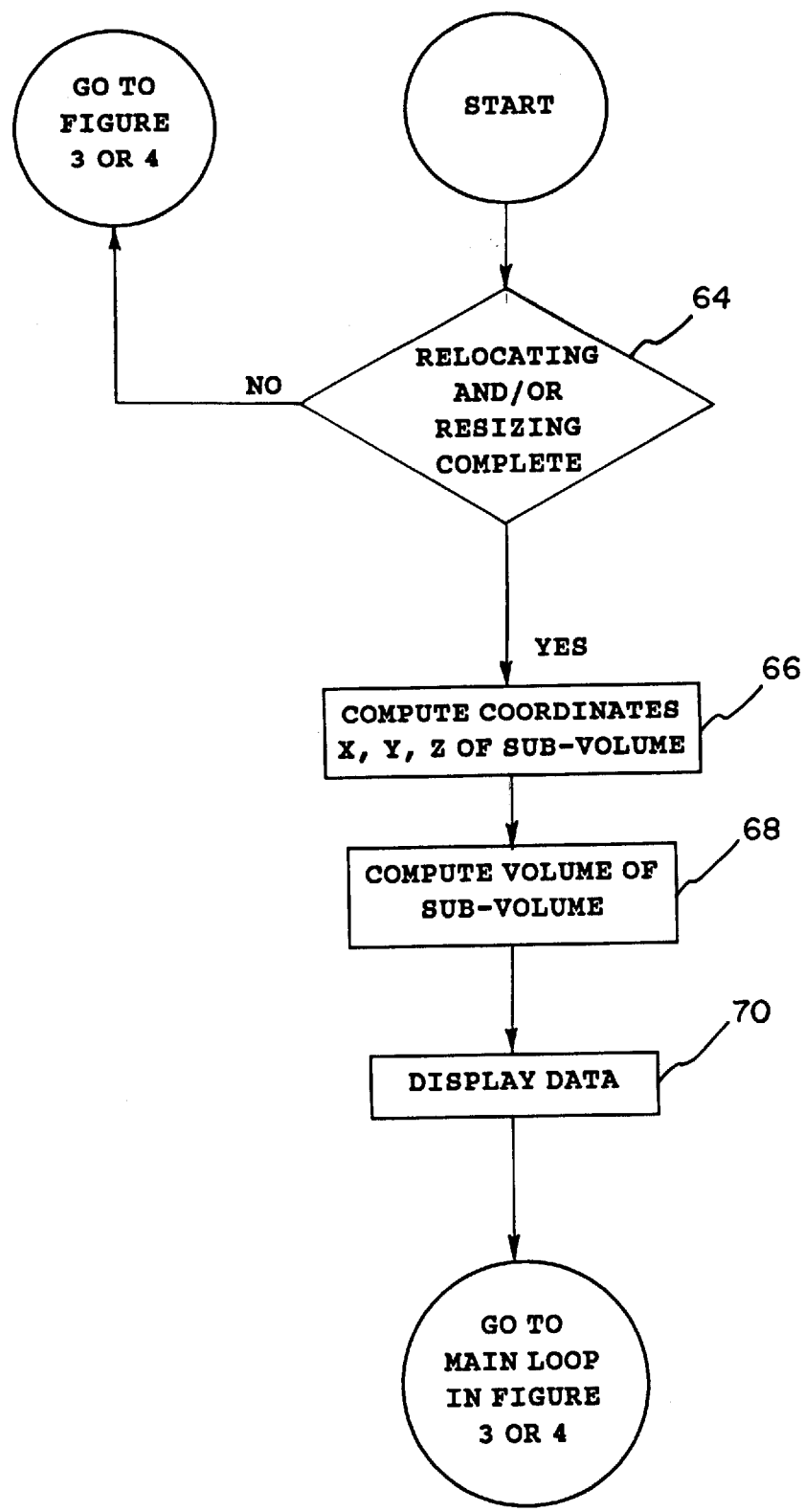
FIG. 5 is a flow chart illustrating a method of computing coordinates and volume of a sub-volume according to the present invention.

Referring now to FIG. 5, after each instance of relocating or resizing of the sub-volume prism 14, it is determined in step 64 whether or not the relocating and/or resizing of the sub-volume is complete. In other words, it is determined whether the right or left mouse button has been released in any of steps 32, 40, 54, or 62. In step 66, the coordinates (x,y,z) of the eight corners are then computed. With these coordinates, the volume of the sub-volume is computed in step 68. Also, the display data is modified using the sub-volume coordinates in order to locate the data which lies within the sub-volume. This data may be re-scaled or displayed separately from the original data in step 70.

Figure 6:
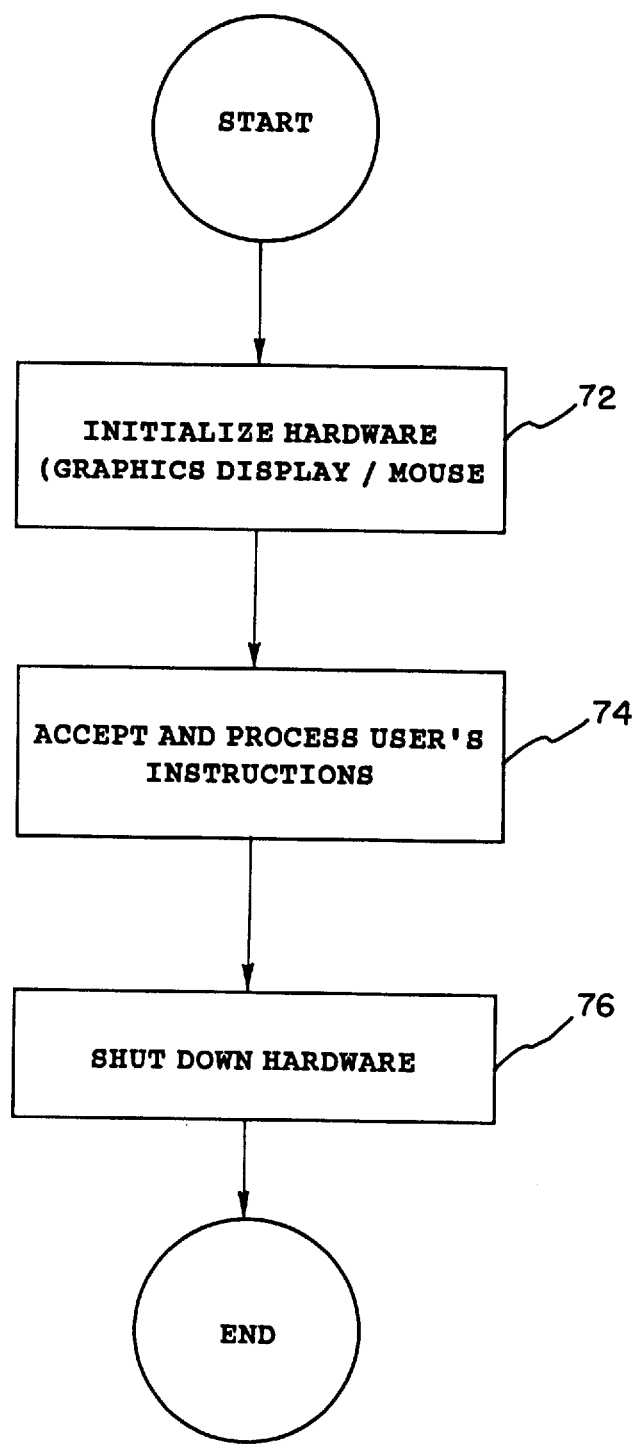
FIG. 6 is a flow chart illustrating a general operation of the program processing according to the present invention.

The block diagram in FIG. 6 summarizes an overall flow of the above-described program. The first step at 72 initializes the system hardware, including the graphics display and the mouse. The next step is to continuously loop and process user commands at step 74 including a continuous update of the cursor position and execution of commands received by the cursor. The final step at 76 is to shutdown the display and mouse. These steps are fully described in the next several paragraphs and are intended to be encompassed by the flow charts illustrated in FIGS. 3 through 6.

Initialization

The graphics display 10 is opened and a picture of the entire three dimensional viewing volume 12 is drawn from a particular point of view. The mouse is activated and a representative user selected sub-volume 14 is also drawn. In order to initialize the entire viewing volume, the eight vertices of a large cube are projected onto the graphics surface 10 and lines are drawn representing the edges of the cube. The software then enters the command processing loop.

Command Processing Loop

The software will enter a continuous loop displaying a menu 16 prompting the user to select a command and then process the user selected commands as shown in FIGS. 3 and 4. The user is capable of resizing in the "x-y" direction or the "z" direction (FIG. 4) and relocating in the "x-y" or the "z" direction (FIG. 3). After the menu 16 is displayed, the software waits for a response indicating which command is to be processed. If the command entered requires input from the mouse, the software enters a loop tracking the cursor and sampling the mouse buttons. Different commands will change the user selected volume in different ways. The commands and the manner in which the cursor and mouse buttons implement these commands are described in connection with and shown in FIGS. 3 and 4. The following is merely a summary of the described steps.

Resize in the x-y direction (a) Moving the mouse with no mouse buttons depressed results in the cursor being tracked over the display.

(b) Placing the cursor on a corner of the sub-volume and depressing the left mouse button selects that sub-volume corner for resizing.

(c) Moving the mouse while the left mouse button is depressed redraws the sub-volume in "x-y" as the cursor is tracked.

(d) Releasing the left mouse button saves the changes to the sub-volume.

Relocate in x-y direction (a) Moving the mouse with no mouse buttons depressed results in the cursor being tracked over the display.

(b) Depressing the left mouse button while the cursor is on the sub-volume selects the entire sub-volume.

(c) Moving the mouse while the left mouse button is depressed relocates the sub-volume in x-y as the cursor is tracked.

(d) Releasing the left mouse button saves the changes to the sub-volume.

Resize in z direction (a) Moving the mouse with no mouse buttons depressed results in the cursor being tracked over the display.

(b) Placing the cursor on a corner of the sub-volume and depressing the right mouse button selects that sub-volume corner for resizing.

(c) Moving the mouse while the right mouse button is depressed redraws the sub-volume in "z" as the cursor is tracked.

(d) Releasing the right mouse button saves the changes to the sub-volume.

Relocate in z direction (a) Moving the mouse with no mouse buttons depressed results in the cursor being tracked over the display.

(b) Depressing the right mouse button while the cursor is on the sub-volume selects the entire sub-volume.

(c) Moving the mouse while the right mouse button is depressed relocates the sub-volume in a "z" direction as the cursor is tracked.

(d) Releasing the right mouse button saves the changes to the sub-volume.

Ouit

The command to quit forces the software to leave the continuous command processing loop and begins the shutdown procedure.

The shutdown procedure simply deactivates the mouse and clears the graphics display.

Each command has an effect on the vertices of the selected volume. The relocate or translate commands translate each vertex of the cube using the following equations.

For every corner of the cube new x coord=old x coord+translation x new y coord=old y coord+translation y new z coord=old z coord+translation z The resizing commands also transform the vertices of the cube. The equations used for the transformation areas follows:

selected x=cursor x selected y=cursor y selected z=cursor z

The corners adjacent to the selected corner are adjusted as follows

If (adjacent corner x=selected x) then adjacent corner x=cursor x end if if (adjacent corner y=selected y) then adjacent corner y=cursor y end if if (adjacent corner z=selected z) then adjacent corner z=cursor z end if The x, y and z coordinates of the selected corner are tracked and then projected onto the graphic surface. After the vertices are fixed, the edges connecting the vertices are drawn, the location of the corners of the sub-volume are computed in the data coordinates and the dimensions of the sub-volume are computed as illustrated in and described in connection with FIG. 5. The sub-volume dimensions and corner locations in the data coordinates are displayed in the menu. Finally the program returns to the main loop waiting for command input.

The described invention provides the operator with the ability to visually select three-dimensional data. The operator need not know the absolute values of the data or coordinates of the sub-volume in order to extract the data. However, the tool will compute and display the coordinates of the sub-volume and the dimensions of the sub-volume. The method extends methods existent in commonly used graphical user interfaces (GUI's).

Alternatives to the methods described include numerical input for the coordinates of the sub-volume selection. Also, the mouse inputs could be incorporated into the keyboard operations or placed in a menu, using the arrow keys for selection.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for manipulating a three-dimensional sub-volume within a graphical display, comprising the steps of:

selecting an option from a menu screen to relocate a three-dimensional sub-volume within said graphical display;

placing a cursor on a selected sub-volume within said graphical display;

depressing a selected one of a left and a right mouse button;

dragging the selected sub-volume to a relocation position within an "x-y" plane of said graphical display with the mouse while maintaining depression of the selected mouse button;

dragging the selected sub-volume to a relocation position within a "z" plane of said graphical display with the mouse while maintaining depression of the selected mouse button; and releasing the depressed, selected mouse button, thereby locking in x, y, and z coordinates of a relocated sub-volume.

2. The method according to claim 1, further comprising the steps of:

selecting an option from the menu screen to resize a sub-volume within said graphical display;

placing the cursor on a selected corner of a sub-volume within said graphical display;

depressing a selected one of the right and left mouse buttons;

dragging the selected corner to a resize location within one of an "x-y" plane and a "z" plane of said graphical display with the mouse while maintaining depression of the selected mouse button; and releasing the depressed one of the selected mouse button, thereby locking in x, y, and z-coordinates of a resized sub-volume.

3. The method according to claim 2 further comprising the steps of:

computing the x, y, and z coordinates for the resized sub-volume;

computing the x, y, and z coordinates for the relocated sub-volume;

computing a volume of the resized sub-volume; and displaying computed data.

4. The method according to claim 3, wherein the step of dragging the selected sub-volume to a relocation position within an "x-y" plane of said graphical display with the mouse further comprises maintaining the selected sub-volume at a constant postion within the "z" plane of said graphical display.

5. The method according to claim 4, wherein the selected mouse button in said step of dragging the selected sub-volume to a relocation position within an "x-y" plane of said graphical display with the mouse button while maintaining depression of the selected mouse button is the left mouse button.

6. The method according to claim 4, wherein said step of dragging the selected sub-volume to a relocation position within the "z" plane of said graphical display further comprises maintaining the selected sub-volume at a constant postion within the "x-y" plane of said graphical display.

7. The method according to claim 3, wherein:

the selected mouse button in said step of dragging the selected sub-volume to a relocation position within the "z" plane of said graphical display with the mouse button while maintaining depression of the selected mouse button is the right mouse button; and said step of dragging the selected sub-volume to a relocation area within a "z" plane of said graphical display with the mouse is performed while holding the "x-y" value constant.

8. The method according to claim 3, wherein said step of dragging the selected corner to a resize location moves the selected corner within the "x-y" plane of said graphical display and maintains the z coordinate of the selected corner at a constant postion within the "z" plane of said graphical display.

9. The method according to claim 8, wherein said step of dragging the selected corner to a resize location further comprises the step of dragging the selected corner to a resize location within the "z" plane of said graphical display with the mouse.

10. The method according to claim 9, wherein said step of dragging the selected corner to a resize location within the "z" plane of said graphical display further comprises maintaining the x and y coordinates of the selected corner at a constant postion within the "x-y" plane of said graphical display.

11. The method according to claim 10, wherein said step of dragging the selected corner to a resize location within the "z" plane of said graphical display further includes maintaining depression of one of the right and left mouse buttons.

12. The method according to claim 2, wherein said step of dragging the selected corner to a resize location moves the selected corner within the "z" plane of said graphical display and maintains the x and y coordinates of the selected corner at a constant postion within the "x-y" plane of said graphical display.

13. The method according to claim 12, wherein said step of dragging the selected corner to a resize location further comprises the step of dragging the selected corner to a resize location within the "x-y" plane of said graphical display with the mouse.

14. The method according to claim 13, wherein said step of dragging the selected corner to a resize location within the "x-y" plane of said graphical display further comprises maintaining the z coordinate of the selected corner at a constant postion within the "z" plane of said graphical display.

15. The method according to claim 14, wherein said step of dragging the selected corner to a resize location within the "x-y" plane of said graphical display further includes maintaining depression of one of the right and left mouse buttons.

16. The method according to claim 1, wherein the selected mouse button in said step of dragging the selected sub-volume to a relocation position within an "x-y" plane of said graphical display with the mouse while maintaining depression of the selected mouse button is the left mouse button.

17. The method according to claim 16, wherein said step of dragging the selected sub-volume to a relocation position within an "x-y" plane of said graphical display with the mouse while maintaining depression of the left mouse button is performed while holding the "z" value constant.

18. The method according to claim 1, wherein said step of dragging the selected sub-volume to a relocation position within a "z" plane of said graphical display with the mouse further includes maintain the selected sub-volume at a constant position within the "x-y" plane of said graphical display.

19. A method for manipulating a three-dimensional sub-volume within a graphical display, comprising the steps of:

selecting an option from a menu screen to relocate a three-dimensional sub-volume within said graphical display;

placing a cursor on a selected sub-volume within said graphical display;

depressing a relocation mouse button, wherein said relocation mouse button is a selected one of a left and a right mouse button;

dragging the selected sub-volume to a relocation position within an "x-y" plane of said graphical display with the mouse while maintaining depression of the relocation button;

dragging the selected sub-volume to a relocation position within a "z" plane of said graphical display with the mouse while maintaining depression of the relocation mouse button;

releasing the depressed, relocation mouse button, thereby locking in x, y, and z coordinates of a relocated sub-volume;

selecting an option from the menu screen to resize a sub-volume within said graphical display;

placing the cursor on a selected corner of a sub-volume within said graphical display;

depressing a resize mouse button, wherein said resize mouse button is a selected one of the left and right mouse buttons;

dragging the selected corner to a resize location within an "x-y" plane of said graphical display with the mouse while maintaining depression of the resize mouse button;

dragging the selected corner to a resize location within a "z" plane of said graphical display with the mouse while maintaining depression of the resize mouse button; and releasing the depressed, resize mouse button, thereby locking in x, y, and z coordinates of a resized sub-volume.

20. The method according to claim 19 further comprising the steps of:

computing the x, y, and z coordinates for the resized sub-volume;

computing the x, y, and z coordinates for the relocated sub-volume;

computing a volume of the resized sub-volume; and displaying computed data.

21. The method according to claim 20 wherein:

said step of dragging the selected sub-volume to a relocation position within an "x-y" plane of said graphical display with the mouse further comprises maintaining the selected sub-volume at a constant postion within the "z" plane of said graphical display;

said step of dragging the selected sub-volume to a relocation position within a "z" plane of said graphical display with the mouse further comprises maintaining the selected sub-volume at a constant postion within the "x-y" plane of said graphical display;

said step of dragging the selected corner to a resize location within the "x-y" plane of said graphical display further comprises maintaining the z coordinate of the selected corner at a constant postion within the "z" plane of said graphical display; and said step of dragging the selected corner to a resize location within the "z" plane of said graphical display further comprises maintaining the x and y coordinates of the selected corner at a constant postion within the "x-y" plane of said graphical display.

* * * * *